Patented Feb. 28, 1933

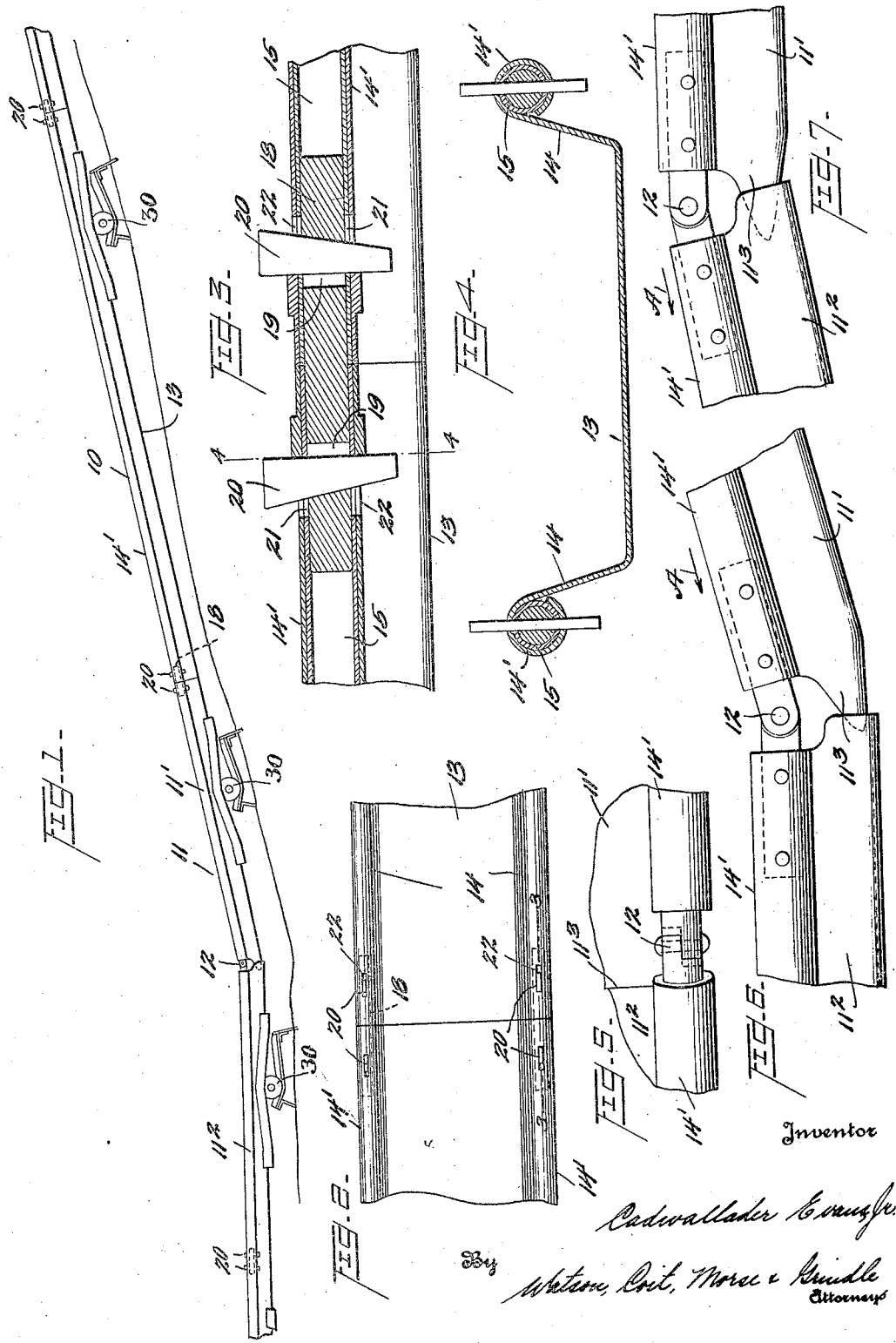

1,899,893

UNITED STATES PATENT OFFICE

CADWALLADER EVANS, JR., OF SCRANTON, PENNSYLVANIA

CONVEYER

Application filed August 3, 1931. Serial No. 554,839.

The present invention relates to conveyers, particularly to conveyers of the reciprocating trough type commonly known as "jigging" conveyers and largely used in the transfer of lump or granular material, such as coal, ore, grain, and the like.

The jigging conveyer now commonly used in coal mines, for instance, comprises essentially a series of elongated trough-like members of sheet metal, secured together end to end, together with means for supporting the conveyer from the roof or floor and means for reciprocating it longitudinally. The reciprocating means generally comprises a device driven either by an electric motor or a compressed air motor or engine, which is so constructed that the conveyer is given a relatively slow movement in one direction and a relatively quick return movement, or vice versa, thus causing the material to move along the trough in one direction. Frequently the conveyer is supported from below by rollers which run on trackways so shaped that the conveyer is given a rising and falling movement as it reciprocates, but oftentimes it is mounted on frames which in turn are supported on ball bearings which facilitate longitudinal movement but cause no vertical movements.

The conveyer may comprise a relatively large number of the elongated trough-like members and hence be of relatively great length. For instance, conveyers of this type three hundred feet long are frequently employed, and still longer ones are used when occasion requires. The reciprocating motor or engine is generally positioned at one end of the same, which is a preferable location, but in the case of a conveyer of great length the engine may be positioned at an intermediate point. A conveyer of such length is, together with its superimposed load, quite heavy, and it is clear that the forces exerted on the conveyer by the reciprocating engine must be great to effect the longitudinal oscillation at the proper speed. Heretofore the forces impressed upon the conveyer by the reciprocating means have been transmitted from end to end of the same through the individual pans themselves, generally through the bottoms of the pans, and, inasmuch as very considerable stresses are set up in the thin sheet metal of the pans by these imposed forces, which stresses are alternately compressive and tensional, it follows that the pans have a considerable tendency to fail or buckle when in use, the pans being usually fabricated of thin sheet metal and not adapted to withstand any considerable longitudinal strain either in compression or tension.

In accordance with the present invention, a conveyer of this general type is provided having means, preferably independent of the pans themselves, for transmitting, from end to end of the same, the forces imposed on the conveyer by the reciprocating device or engine. Preferably a force transmitting element is attached to the side portion of each pan adjacent the upper edge thereof and the adjacent ends of adjacent force transmitting elements rigidly connected together in assembling the conveyer. The pans or troughs may be secured together by this means only, and, as a result, the completed conveyer includes two force transmitting elements running continuously from end to end thereof, through which all of the forces necessary to effect reciprocatory movements of the conveyer are transmitted. As a result, the sheet metal trough members themselves are subjected to no longitudinal forces tending to destroy the same, and there is no necessity for making these pans of such heavy material that these forces may be successfully withstood.

In some cases additional means may be used to secure adjacent pans together, for instance, securing devices positioned adjacent the lower corners of the pans. When such means are employed, the possibility that "play" or lost motion in the joints between the pans may occur is practically eliminated. This lost motion is highly undesirable in that it often results in buckling of the conveyer at the joints, and mashing of the ends of the pans. There may also be so much lost motion in a poorly designed conveyer that the end of the conveyer remote from the reciprocating engine will have very little reciprocating motion.

Preferably I connect the ends of the force transmitting elements together by means which not only effects a rigid connection but which also automatically takes up any looseness due to wear of the securing means itself. Inasmuch as the floor of a mine or other surface on which the conveyer may be disposed is oftentimes uneven, I contemplate providing a hinge intermediate the ends of one or more of the trough members so that the two sections of the trough may be disposed at a slight angle to the other to accommodate small rises or depressions in the supporting surface.

In accommodating the invention to conveyers of this general type but of different detailed constructions, the design and arrangement of the component elements of the invention may be considerably modified without departure from the spirit and scope of the invention, as will be apparent to one skilled in the art. By way of example, one form of the invention is illustrated in the accompanying drawing, in which:

Figure 1 is a side elevation of a portion of a conveyer formed by uniting a plurality of the improved conveyer members;

Figure 2 is a top plan view of a portion of the conveyer showing the means for securing two conveyer members together;

Figure 3 is a section on line 3—3 of Figure 2 on a somewhat larger scale;

Figure 4 is a section on line 4—4 of Figure 3;

Figure 5 is a plan view of a hinge, by means of which two sections of a conveyer member are secured together so as to be angularly adjustable to each other; and Figures 6 and 7 are side elevations of this hinge, showing the associated conveyer sections at different angles relatively to each other.

In Figure 1 of the drawing the numeral 10 indicates one of the conveyer members and the numeral 11 a second conveyer member, these members being positioned in a chain of such members which may be as long as circumstances may require. Member 10 is straight, continuous, and rigid from end to end, while member 11 comprises two sections indicated at 11' and 11², respectively, hinged together at 12. By adding to the conveyer a hinge section of this type wherever necessary, the conveyer is enabled to readily adapt itself to changes of inclination of the floor level without interfering with its effectiveness in delivering the materials spaced upon it.

One of the conveyer members is shown in cross-section in Figure 4 and will be seen to comprise a bottom portion 13 and upwardly and outwardly extending side members 14. The force transmitting elements are preferably attached to the side portions 14 adjacent the upper edges thereof, and in the embodiment of the invention selected by way of example for disclosure I illustrate force transmitting elements formed as tubes 15, each of these tubes being enclosed within an elongated cylindrical recess formed by curving the upper edges 14' of the side portions 14 of the trough. The tubes 15 are of comparatively light but very rigid construction and extend from end to end of the conveyer member, being secured to the conveyer member by any suitable means. Thus, bolts may be passed through the encircling flange 14' and tube 15 at one or more points along the length thereof, or members 14' and 15 may be electrically welded together so that each tube 15 is prevented from having a movement longitudinally of its associated trough member.

In Figures 2 and 3 of the drawing, a preferred means of rigidly securing the adjacent ends of two trough members together is disclosed. It will be seen that positioned in each tube 15, and bridging the joint between the adjacent ends of adjacent trough members, are cylindrical connecting bars 18. These bars 18 are preferably loosely received in both registering tubes 15, and each is slotted as at 19 to receive a key 20 which not only passes through this slot but also through registering slots 21 formed in tubes 15 and slots 22 formed in the cylindrical flanges 14' of the trough member. The inclined faces of the keys 20 are oppositely disposed and rest against correspondingly inclined faces of the slots 19 of bars 18. The mutually facing edges of the keys 20 are substantially parallel and bear only against the edges of the slots formed in the tube 15 and flange 14'. From this it is apparent that the keys 20 act to hold the adjacent ends of two adjacent conveyer members rigidly together. Should any wear occur between the keys, bars 18, and reinforcing tubes 15, the wedges will tend to drop farther into the slots and to compensate therefor, all of the slots being sufficiently elongated to permit downward movement of the wedges when occasion requires.

Due to the fact that the mine floors or ground surfaces are frequently uneven, I place an occasional hinged section in the conveyer, such as the section indicated at 11. A satisfactory type of hinge is clearly shown in Figures 5, 6, and 7. By the hinges thus provided, the conveyer is permitted to turn a small vertical angle without difficulty. To prevent catching of the material as it passes by the hinge, I provide one of the sections of the trough member, such as the section 11', with a projecting flange, such as 11³, which extends over the bottom of the pan section 11². It will be understod that, where the pan sections are hinged together in this manner, the material being conveyed will be caused to pass along the conveyer in the direction indicated by the arrows A in Figures 6 and 7. Notwithstanding the hinge joint, it will be apparent that the forces imparted to any trough member by the reciprocating machine will be conveyed to all of the other trough members of the conveyer through the force transmitting elements 15, the sheet metal material supporting troughs themselves being very largely relieved of stresses due to the action of the reciprocating machine.

While the pans are relieved, by the reinforcing elements, of the heavy longitudinal tensile and compressive stresses which they would have to carry were these elements not employed, due to the action of the reciprocating engine, they nevertheless are stressed to a certain extent in resisting forces due to the weight of the imposed load of material and in resisting "whipping" of the conveyer, that is, tendency of the conveyer to get out of horizontal alignment. Inasmuch as the two force transmitting elements are connected by the pans, they form, together with the pan, a single rigid structure offering great resistance to horizontal flexure.

Preferably the conveyer members are mounted upon roller supports which are generally indicated at 30 in Figure 1 of the drawing. These supports are of well-known type and operate in a well-known manner and need not be specifically described. Numerous types of conveyer reciprocating engines or devices have heretofore been designed or suggested and are now well-known in the art. For that reason I have not deemed it necessary to illustrate such mechanism. It will be understood that the reciprocating machine is usually attached to the end member of a conveyer, but within the import of the present invention it may, of course, be attached to any intermediate member. I also contemplate that the improved conveyer may be suspended by chains, but in the usual case it will be supported upon the roller devices such as indicated at 30.

While I have described the force transmitting elements as comprising tubes, such as indicated at 15, it will be appreciated that the invention is by no means limited to elements of any particular shape, although I prefer the tubular form inasmuch as tubes may be readily attached to the upper edges of the conveyer members in the manner illustrated in the drawing and also provide convenient receptacles for the insertion of the bars 18. Nevertheless the invention contemplates various types of force transmitting elements and various types of connecting devices for rigidly securing these force transmitting elements together, in adapting the invention to conveyers, the trough-like members of which vary in details of design. It is obvious that the force transmitting elements may be attached to the pans in various ways at various points. Thus they may be secured to the pans near the lower corners thereof, or even to the bottom, without departure from the invention. In certain cases the force transmitting elements may be formed integral with the pans in the process of manufacture, but, generally speaking, it is more economical to attach these elements after the pan has been rolled and formed.

Having thus described the invention, what is claimed as new and desired to be secured by Letters Patent is:—

1. A conveyer of the class described comprising, in combination, a plurality of elongated trough-like sheet metal members arranged end to end, a force transmitting element connected to each such member and extending from end to end thereof, and means detachably securing the adjacent ends of adjacent elements together, said means being adapted to automatically take up wear and maintain a rigid connection between said elements.

2. A conveyer of the class described comprising, in combination, a plurality of elongated trough-like sheet metal members arranged end to end, each such member having upwardly extending side portions terminating in integral tubular flanges coextensive in length with said member, and a force transmitting element housed within each such tubular flange, the ends of the force transmitting elements associated with one member being connected to the adjacent ends of corresponding elements of adjacent trough members, the forces applied to the conveyer during operation being transmitted from end to end thereof wholly through said elements, for the purpose set forth.

3. The combination set forth in claim 2 in which one (or more) of the trough members is interrupted intermediate its ends and the force transmitting elements thereof are provided with flexible joints to permit flexure of the said member at this point.

In testimony whereof I hereunto affix my signature.

CADWALLADER EVANS, Jr.